April 29, 1947.                M. GABRIEL ET AL                2,419,637
SYNCHRONIZING SYSTEM
Filed Sept. 8, 1944                          3 Sheets-Sheet 1
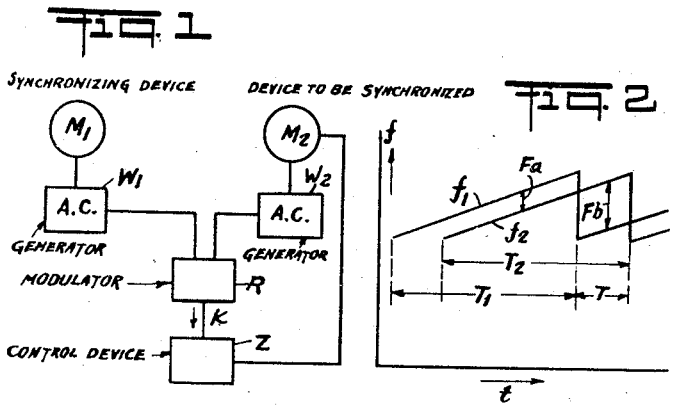
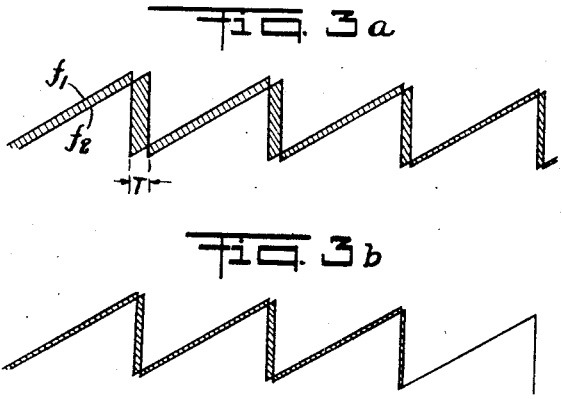
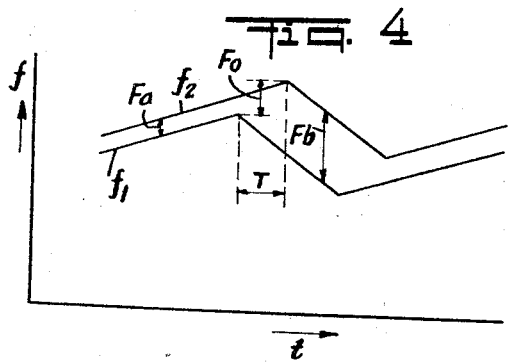
INVENTOR.
MARCEL GABRIEL & GUSTAV GUANELLA
BY
ATTORNEY April 29, 1947.　　M. GABRIEL ET AL　　2,419,637
SYNCHRONIZING SYSTEM
Filed Sept. 8, 1944　　3 Sheets-Sheet 2
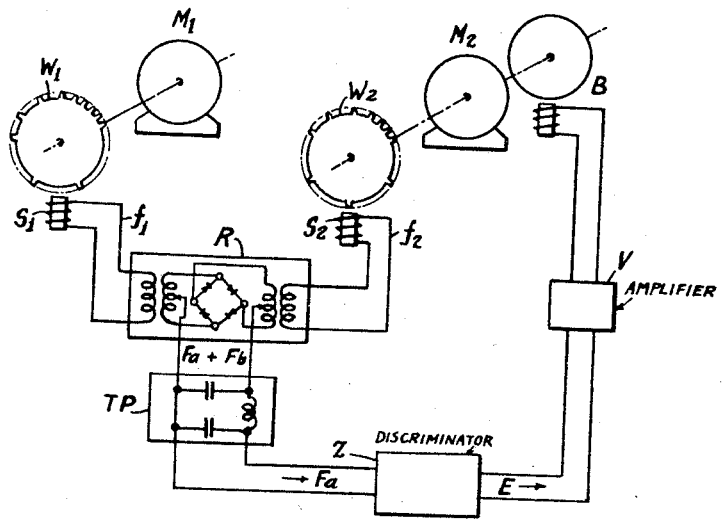
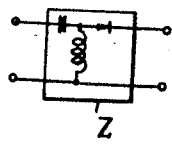 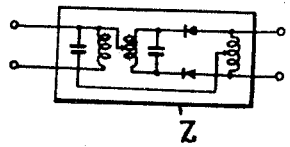
INVENTOR.
MARCEL GABRIEL & GUSTAV GUANELLA
BY
ATTORNEY Patented Apr. 29, 1947

2,419,637

UNITED STATES PATENT OFFICE 2,419,637

SYNCHRONIZING SYSTEM

Marcel Gabriel, Biel, and Gustav Guanella, Zurich, Switzerland, assignors to Radio Patents Corporation, New York, N. Y., a corporation of New York Application September 8, 1944, Serial No. 553,140
In Switzerland February 20, 1943

14 Claims. (Cl. 172—293)

1

The present invention relates to a system for and method of synchronizing periodic phenomena or devices, such as rotating machines, and the main object of the invention is to provide an improved system of this type which is both simple in design as well as efficient and reliable in operation.

It is known to synchronize rotating machines by comparing alternating voltages having frequencies proportional to the speeds of rotation of said machines, more particularly by determining the frequency and phase deviations between said voltages and readjusting the relative speed of the machine to be synchronized so as to restore proper frequency and phase coincidence. A disadvantage of this method is the fact that a permanent difference may exist between the frequency response characteristics of the machines to be synchronized, which difference may amount to an integer multiple of the oscillation period of the alternating voltages being compared. For this reason, additional costly means have often to be provided to avoid differences in the frequency response characteristics.

It is also known to synchronize two machines by comparing the phase of synchronizing impulses derived from one of the machines (synchronizing machine) with the phase of the other machine (machine to be synchronized). This may be accomplished by reversing the polarity of the synchronizing signals in rhythm with the rotation of the machine, whereby to obtain a regulating quantity from the resulting voltages and currents, which may serve to influence or control the machine to be synchronized so as to reduce its deviation from synchronism. The disadvantage of this method is due, among others, to the fact that a relatively wide band frequency channel is required for the transmission of the synchronizing impulses.

The disadvantages of the known synchronizing methods are overcome according to the present invention by the use of alternating currents or voltages of periodically varying frequency being produced by both the synchronizing machine and the machine to be synchronized, the difference frequency between said currents or voltages being determined and utilized to control the speed of the machine to be synchronized so as to restore and maintain it in locked synchronism with the synchronizing machine.

The invention as to its objects and novel aspects will be further understood from the following detailed description of a few practical embodiments thereof, taken in reference to the accompanying drawings forming part of the specification, and wherein:

Figure 1 is a schematic block diagram of a basic synchronizing system constructed in accordance with the principles of the invention;

Figures 2, 3a, 3b and 4 are theoretical diagrams explanatory of the function and operation of the invention;

Figure 5 is a more detailed circuit diagram illustrating a system for synchronizing a pair of rotating devices or machines in accordance with the invention;

Figures 6a and 6b are fractional circuit diagrams illustrating modifications of the system shown in Figure 5;

Figure 7:
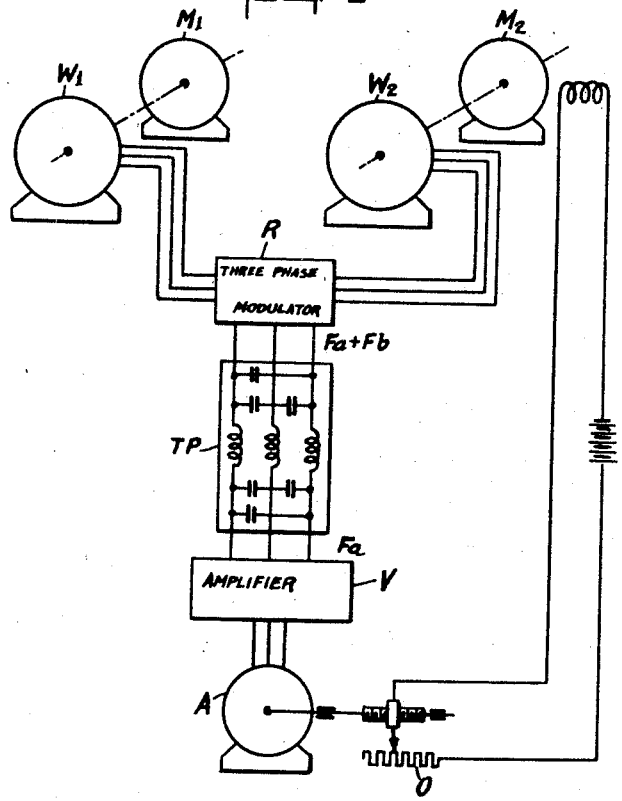
Figure 7 is a diagram of a synchronizing system showing another modification of Figure 5.

Referring more particularly to Figure 1, item $M_1$ indicates schematically the synchronizing machine or other rotating device and item $M_2$ indicates the machine to be synchronized. Items $W_1$, $W_2$ are a pair of alternating current voltage generators each coupled with one of the machines $M_1$ and $M_2$ and serving to produce alternating current energies having frequencies $f_1$ and $f_2$, respectively. Item R is a modulator in which the frequencies $f_1$ and $f_2$ are mutually intermodulated, and item Z is a device to produce a control current from the modulation product suitable to cause the speed of machine $M_2$ to be regulated. Before the machines are actually synchronized, it is necessary that their speeds should be caused to coincide approximately by known means, so that there are only relatively small deviations between the instantaneous frequencies $f_1$ and $f_2$.

Figure 2 shows more clearly the periodic variations of the frequencies $f_1$ and $f_2$ as a function of time, according to one embodiment of the invention. The period $T_1$ of frequency $f_1$ corresponds to a single rotation of the shaft of the synchronizing machine $M_1$ and the period of frequency $T_2$ corresponds to a single rotation of the machine $M_2$ to be synchronized. Both frequencies $f_1$ and $f_2$ furthermore change their value gradually within the same frequency range between predetermined lower and upper limit frequencies. At the beginning of the synchronization process, there is a displacement T between the alternating currents or voltages to be compared, resulting in the difference frequencies $F_a$ and $F_b$, as indicated in the drawing. In the modulator R, a modulation product of the frequencies $f_1$ and $f_2$ is formed, which, upon suitable filtering, supplies a control voltage K having a frequency proportional to the instantaneous frequency difference between $f_1$ and $f_2$ at any instant. This voltage K after passing the converting device serves to influence the machine $M_2$ so as to restore and maintain exact or locked synchronism between the machines $M_1$ and $M_2$. Since the control voltage K is not a quantity responsive to the sense or sign of the relative deviation between the frequencies $f_1$ and $f_2$, it is necessary that the speed of the machine $M_2$ to be synchronized deviates only in a single sense from the speed of the synchronizing machine $M_1$, i. e., that the initial speed of machine $M_2$ at the beginning of a synchronizing process should always be either smaller or greater than the speed of the synchronizing machine $M_1$.

A linear, such as a saw-tooth shaped, frequency variation during a complete revolution of the devices $M_1$ and $M_2$, as shown at $f_1$ and $f_2$ in Figure 2, respectively, may be obtained in various manners, such as by means of well known magnetic or tone wheels driven by the devices $M_1$ and $M_2$ and each comprising a disk having peripheral teeth moving past a stationary magnet provided with a winding. In the latter, an alternating voltage will be induced due to the periodic flux variations as a result of the variable reluctance when a tooth or the spacing between successive teeth is opposite to said magnet. By gradually varying the pitch between successive teeth, any desired frequency change may be obtained, such as shown in Figure 2.

Another means for producing a frequency modulated output voltage consists in the use of perforated disks or light choppers driven by the machines $M_1$ and $M_2$ and periodically interrupting a beam of light impinged upon a photoelectric cell. By varying the pitch or spacing distance between successive disk perforations, the frequency of the output current of the photoelectric cell may be given a desired variation including a linear or saw-tooth-like change, as shown in Figure 2.

The synchronizing process according to the invention may be further understood by reference to Figures 3a and 3b, wherein the shaded areas present an approximate picture of the control voltage during the corresponding time periods. The period $T_2$ of the alternating voltage produced by the generator $W_2$, at the beginning of the synchronizing process, is shown to be greater than the period $T_1$ of the voltage produced by generator $W_1$, in accordance with the assumption of an initially lower speed of the machine $M_2$ to be synchronized. After the displacement T between the machines $M_1$ and $M_2$ has been reduced to a minimum by reducing the difference between the frequencies $f_1$ and $f_2$, further synchronizing or regulation to a definite relative phase will occur by the interaction of the alternating voltages in the modulator R. In the latter case, the direct current component of the control voltage K which occurs after the frequencies $f_1$ and $f_2$ have been brought to coincidence, constitutes a further regulating quantity which varies both as to magnitude and sign, depending upon the sense of relative phase departure from a normal phase relation between the frequencies $f_1$ and $f_2$. More particularly, this control voltage will be zero if the relative phase displacement between the equalized frequencies $f_1$ and $f_2$ is 90°. The regulating device of the machine $M_2$ is then no longer influenced, that is to say, at this instant an entirely rigid or locked synchronism is maintained between the two machines. If small deviations from this normal phase position occur in either sense, the direct control current produced by the modulator R will attain relatively high values of corresponding sign, so as to cause the phase to be readjusted immediately in the desired direction, to restore the synchronism between the devices.

As already mentioned, with such an arrangement, the control voltage or current K derived from the frequencies $f_1$ and $f_2$ can only be employed for synchronizing from one side, that is to say, only if the initial speed of the machine to be synchronized differs from that of the synchronizing machine in a predetermined sense. If, however, instead of regulating to a frequency difference equal to zero, the regulation is for a constant mean frequency difference, it is possible to synchronize from both sides or for either sense of deviation of the speed of machine $M_2$ from a desired normal difference therebetween and the speed of machine $M_1$.

Bilateral synchronization may also be achieved by comparing multi-phase voltages with a periodically varying frequency, whereby a resultant field is produced which rotates in accordance with the difference of the frequencies $f_1$ and $f_2$. This rotating field revolves either in a clockwise or counterclockwise direction depending upon the sense of deviation from synchronism, i. e., in turn the sense of the frequency difference, so that a correct regulation is enabled under all circumstances. This method may, for instance, be carried out by the aid of a rotating-field machine whose rotor revolves at a speed proportional of the difference of the frequences $f_1$ and $f_2$, or according to the known multi-phase modulation method. With the latter method, a rotating field is obtained in the output system whose frequency of rotation is equal to the algebraic sum of the frequencies of the associated input rotating fields.

Synchronization to a constant frequency difference will be further understood by reference to the diagram shown in Figure 4, wherein $f_1$ and $f_2$ again represent the frequencies of the alternating voltages which in this case rise and fall steadily within two different frequency ranges and are again produced by the generators $W_1$ and $W_2$ coupled with the machines $M_1$ and $M_2$, respectively. In the beginning, there is a displacement T between the two frequencies $f_1$ and $f_2$, resulting in the two frequency differences $F_a$ and $F_b$. The speed of the machine $M_2$ to be synchronized is now regulated until the constant mean frequency difference $F_0$ prevailing with a minimum phase displacement T is reached. Contrary to the first method described, the regulating current obtained by frequency modulation and subsequent filtering of the modulation product assumes a definite constant frequency value when both machines are in synchronism.

The method according to the invention may be realized in practice by means of the arrangement shown in Figure 5. The machines $M_1$ and $M_2$ are shown to drive tone wheels or alternating current generators $W_1$, $W_2$ having irregular tooth pitches so as to obtain a frequency deviation of the type shown in Figures 2 or 4. The frequencies $f_1$ and $f_2$ thus produced in the induction coils $S_1$ and $S_2$ are mutually intermodulated in the rectifier type or ring modulator R of known design. Of the two resulting modulation frequencies $F_a$, Fb, only the lower one Fa is passed by the low-pass filter TP. A direct current voltage E proportional to the frequency difference Fa is then produced in the frequency discriminator Z. This voltage, after adequate amplification in an amplifier V, serves to operate an electromagnetic brake B affecting the speed of the machine $M_2$. The discriminator Z may be designed as shown in Figures 6a and 6b. When regulating to zero frequency difference, a discriminator or simple slope filter according to Figure 6a may be used. On the other hand, if the synchronization is to a certain frequency difference Fo, according to the example described in connection with Figure 4, a discriminator as shown in Figure 6b is required which contains a band filter tuned to the frequency Fo and serving as a phase or frequency discriminator element in a manner well known in the art. Accordingly, with input frequencies above or below the value Fo, the discriminator produces a positive or negative control voltage applied to the amplifier V. In this manner, a stable regulation of the machine $M_2$ to a constant frequency difference and phase with respect to the machine $M_1$ is enabled in a most simple manner.

When comparing multi-phase voltages, the arrangement shown in Figure 7 may be used. The three-phase modulator R produces three-phase voltages with frequencies Fa and Fb, three-phase low-pass filter TP being provided to pass only the alternating voltage of frequencies Fa. The latter, after amplification in the amplifier V, serves to drive a synchronous motor A which in turn serves to actuate a regulating element o in the form of a resistance as shown.

To obtain a three-phase voltage from the generators $W_1$ and $W_2$, the latter may consist of three tone wheels relatively displaced by 120 electrical degrees and having their output windings connected in star or delta to obtain a concatenated three-phase output applied to the three-phase modulator R. The latter may consist of three electronic mixer tubes having their cathodes connected to the common neutral point, being each provided with two control grids excited by the corresponding phase voltages supplied by the generators $W_1$ and $W_2$, respectively.

The plates of the tubes will then supply the corresponding combination frequencies Fa and Fb applied to the low-pass filter TP. Accordingly, the output of the filter TP, upon amplification by the amplifier V, supplies a three-phase current having a frequency Fa which varies in proportion to the degree of deviation of the device $M_2$ to be synchronized from synchronism with the synchronizing device $M_1$. This current when applied to the three-phase asynchronous motor A produces therein a rotating field having a speed which varies in proportion to the deviation from synchronism between the device $M_1$ and $M_2$ and whose direction of rotation depends upon the sense of said deviation in relation to the sense of rotation of the synchronizing device $M_1$.

Figure 8A:
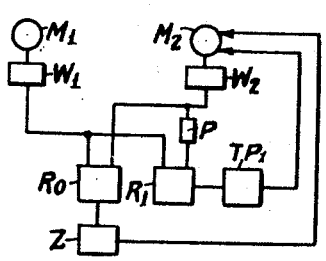
Figures 8a and 8b are block diagrams similar to Figure 1, illustrating still further modifications of the invention.

In an arrangement according to Figure 5, additional means may be employed to insure exact synchronism between the synchronizing machine and the machine to be synchronized. Thus, in the arrangement according to Figure 8a, the modulator $R_0$ serves to maintain the synchronism, while a further comparison device $R_1$ comes into operation after the generators $W_1$ and $W_2$ have attained the same frequency due to the effect of the low-pass filter $TP_1$ connected between the output of $R_1$ and the control member of the machine $M_2$. The comparison device $R_1$ may, for instance, operate according to the wattmeter principle and supply its regulating voltage until its input voltages are phase displaced by 90° or, when using a series phase-displacing element P in one of its input circuits, until the generators $W_1$ and $W_2$ supply voltages which are in exact phase with each other.

Figure 8B:
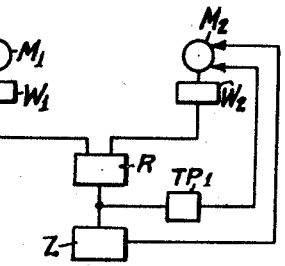

In the arrangement shown in Figure 8b, the comparison devices $R_0$ and $R_1$ are united in a single comparison device R and the segregation of two regulating voltages is effected outside this device. In this manner, a pair of control currents are produced in Figures 8a and 8b, one of which is responsive to relative frequency deviations between the synchronizing energies, while the other varies in sense and magnitude in accordance with the relative phase between said energies, after their frequencies have been equalized by said first control current.

Instead of employing a saw-toothed-shaped frequency variation curve described hereinabove for the alternating voltages being compared, it is also possible to use a sinusoidal or any other type of frequency variation. The modulation periods $T_1$, $T_2$ may also correspond to more than one revolution of the shaft of the synchronizing machine or machines to be synchronized, respectively. It is also possible to pass the control voltage K obtained by filtering the modulation product to an indicating instrument and to regulate manually the speed of the machine $M_2$ to be synchronized.

In addition to producing a frequency difference in a purely electrical manner by the formation of a product in a modulator, it is also possible to derive the frequency difference in a purely mechanical manner by operating the wheels of a mechanical differential at the frequencies of the alternating voltages to be compared, in which case the transmission wheel of the differential rotates with the frequency difference. The frequencies may also produce two rotating fields with different speeds of rotation in an electrical differential whose rotor revolves with the difference of the frequencies.

In practice, it may happen that the difference T in the frequency response curves cannot be reduced to the desired extent because the frequency difference may be already below the controllable values before the desired end state is reached. This can be remedied by increasing the frequencies $f_1$ and $f_2$.

The method according to the invention may also be used for synchronizing any kind of oscillation generator, in which case the control or correcting voltage or other quantity serves to adjust the frequency of the generator to be synchronized in accordance with any of the well known means available for this purpose in the prior art.

We claim:

1. Means for synchronizing two periodic phenomena comprising means for producing a pair of alternating current electric energies each having a frequency varying periodically in a definite integral relation to the periodicity of a different one of said phenomena, means for mutually intermodulating said energies to produce difference frequency energy, and further means for utilizing said difference frequency energy to affect at least one of said phenomena, whereby to restore and maintain the synchronism between said phenomena.

2. Means for synchronizing two periodic phenomena comprising means for producing a pair of alternating current electric energies each having a frequency varying periodically within each period of a different one of said phenomena, means for mutually intermodulating said energies to produce difference frequency energy, and further means for utilizing said difference frequency energy to affect at least one of said phenomena, whereby to restore and maintain the synchronism between said phenomena.

3. Means for synchronizing two periodic phenomena comprising means for producing a pair of alternating current electric energies each having a frequency varying linearly and periodically between lower and upper limits and in definite integral relation to the periodicity of a different one of said phenomena, means for mutually intermodulating said energies to produce difference frequency energy, and further means for utilizing said difference frequency energy to affect at least one of said phenomena, whereby to restore and maintain the synchronism between said phenomena.

4. Means for synchronizing two periodic phenomena comprising means for producing a pair of alternating current electric energies each having a frequency varying linearly and periodically between equal lower and upper limits within each period of a different one of said phenomena, means for mutually intermodulating said energies to produce difference frequency energy, and further means for utilizing said difference frequency energy to affect at least one of said phenomena, whereby to restore and maintain the synchronism between both said phenomena.

5. Means for synchronizing two periodic phenomena comprising means for producing a pair of alternating current electric energies each having a frequency varying linearly and periodically between different lower and upper limits within each period of a different one of said phenomena, means for mutually intermodulating said energies to produce difference frequency energy, and further means for utilizing said difference frequency energy to affect at least one of said phenomena, whereby to restore and maintain the synchronism between both said phenomena.

6. Means for synchronizing two periodic phenomena comprising means for producing a pair of alternating current electric energies each having a frequency varying linearly and periodically according to a saw-tooth curve between equal lower and upper limits and within each period of a different one of said phenomena, means for mutually intermodulating said energies to produce difference frequency energy, and further means for utilizing said difference frequency energy to affect at least one of said phenomena, whereby to restore and maintain the synchronism between said phenomena.

7. Means for synchronizing a pair of rotating devices comprising means for producing a pair of alternating current energies each having a frequency varying periodically between lower and upper limits and in a definite integral relation to the number of revolutions of a different one of said devices, means for mutually intermodulating said energies to produce difference frequency energy, and further means for utilizing said difference frequency energy to control the speed of at least one of said devices, whereby to restore and maintain the synchronism between said devices.

8. Means for synchronizing a pair of rotating devices comprising means for producing a pair of alternating current electric energies each having a frequency varying linearly and periodically between lower and upper limits and within each revolution of a different one of said devices, means for mutually intermodulating said energies to produce difference frequency energy, and further means for utilizing said difference frequency energy to control the speed of at least one of said devices, whereby to restore and maintain the synchronism between said devices.

9. Means for synchronizing a pair of rotating devices comprising a pair of tone wheels each driven by one of said devices and having a varying pitch between the teeth thereof to produce a pair of alternating current electric energies each having a frequency varying periodically between lower and upper limits and within each revolution of one of said devices, means for mutually intermodulating said energies to produce difference frequency energy, and further means for utilizing said difference frequency energy to control the speed of at least one of said devices, whereby to restore and maintain the synchronism between said devices.

10. Means for synchronizing a pair of rotating devices comprising means for producing a pair of alternating current electric energies each having a frequency varying according to a saw-tooth curve between equal lower and upper limits and within each revolution of a different one of said devices, whereby to produce a pair of relatively wide and narrow bands of difference frequencies between said energies upon relative departure from synchronism of at least one of said devices, means for intermodulating said energies to produce difference frequency energy, filter means for segregating the energy of one of said difference frequency bands from the output of said modulating means, a frequency discriminator for converting the segregated frequencies into energy of corresponding amplitude change, and means to control the speed of at least one of said devices in accordance with the output of said discriminator, whereby to restore and maintain the synchronism between said devices.

11. Means for synchronizing a pair of rotating devices comprising means for producing a pair of alternating current electric energies each having a frequency rising and falling substantially linearly between different lower and upper limits and within each period of revolution of a different one of said devices, whereby to produce a pair of relatively wide and narrow bands of difference frequencies between said energies upon relative departure of one device from synchronism with the other device, means for intermodulating said energies to produce difference frequency energy, filter means for segregating from the modulation product control energy of said narrow band difference frequencies, a discriminator for converting the segregated control energy into energy of corresponding amplitude changes, and means to control the speed of at least one of said devices by the output of said discriminator, whereby to restore and maintain the synchronism between said devices.

12. In a synchronizing system, a first rotating device, a second rotating device, means for maintaining said second device at the same speed and a constant relative phase with respect to said first device comprising means for producing a pair of alternating current electric energies each having a frequency varying according to a saw-tooth curve between equal lower and upper limits and within each revolution of a different one of said devices, whereby to produce a pair of relatively wide and narrow bands of difference frequencies between said energies upon relative departure from synchronism of at least one of said devices, means for intermodulating said energies to produce difference frequency energy, filter means for segregating the energy of one of said difference frequency bands from the output of said modulating means, a frequency discriminator for converting the segregated frequencies into energy of corresponding amplitude change, and means to control the speed of said second device in accordance with the output of said discriminator, whereby to restore and maintain the synchronism between said devices.

13. In a synchronizing system, a first rotating device, a second rotating device, means for maintaining said second device at a constant speed difference with respect to said first device comprising means for producing a pair of alternating current electric energies each having a frequency rising and falling substantially linearly between different lower and upper limits and within each period of revolution of a different one of said devices, whereby to produce a pair of relatively wide and narrow bands of difference frequencies between said energies upon relative departure of one device from synchronism with the other device, means for intermodulating said energies to produce difference frequency energy, filter means for segregating from the modulation product control energy of said narrow band difference frequencies, a discriminator for converting the segregated control energy into energy of corresponding amplitude changes, and means to control the speed of said second device by the output of said discriminator, whereby to restore and maintain the synchronism between said devices.

14. In a synchronizing system, a first periodic device having a first frequency, a second periodic device having a second frequency, means for maintaining said devices at the same frequency and a constant relative phase comprising means for deriving a pair of alternating current energies, each having a frequency varying periodically in definite integer relation to said first and second frequencies respectively, means for intermodulating said energies to produce difference frequency energy, further means for producing control energy varying in amplitude in proportion to the frequency of said difference frequency energy, and means utilizing said control energy to control the frequency of said second device, whereby to restore and maintain the synchronism between said devices.

MARCEL GABRIEL.
GUSTAV GUANELLA.

REFERENCES CITED

The following references are of record in the file of this patent:

UNITED STATES PATENTS

| Number | Name | Date |
|---|---|---|
| 1,763,909 | Stoller et al. | June 17, 1930 |